March 10, 1953     L. K. HERNDON     2,631,087
SULFUR RECOVERY PROCESS

Filed Aug. 2, 1950     5 Sheets—Sheet 5

Lyle Kermit Herndon
Inventor
Haynes and Koenig
Attorneys

Patented Mar. 10, 1953

2,631,087

UNITED STATES PATENT OFFICE 2,631,087

SULFUR RECOVERY PROCESS

Lyle Kermit Herndon, Columbus, Ohio, assignor, by mesne assignments, to The Fluor Corporation, Ltd., a corporation of California Application August 2, 1950, Serial No. 177,288

3 Claims. (Cl. 23—226)

This invention relates to processes for recovering sulfur values from sulfur-containing fluids and more particularly to processes for the recovery of sulfur values from sulfur dioxide-containing gases such as produced by decomposition of acid sludges.

This application is a continuation-in-part of my copending U. S. patent application, Serial No. 47,981, filed September 7, 1948, now abandoned.

Briefly, this invention is directed to novel methods for producing elemental sulfur or carbon disulfide from such sulfur-containing fluids as acid sludges and sulfur dioxide-containing gases (e. g. smelter off gases or gases produced from the decomposition of acid sludges). This invention includes such recovery processes where sulfur dioxide-containing gases, obtained from any convenient source, as for example by the decomposition of acid sludges, are reacted at high temperatures with reducing agents to produce a gas having a ratio of approximately two moles of hydrogen sulfide to one mole of sulfur dioxide which is thereafter catalytically converted to elemental sulfur.

Among the several objects of this invention are the provision of flexible, economical, simple and reliable processes for the recovery of sulfur values from any convenient source of sulfur-containing gases; the provision of sulfur recovery processes which will simultaneously recover sulfur values from both sulfur dioxide gases and hydrogen sulfide gases; the provision of methods for effectively decomposing acid sludge from petroleum refining to provide useful products; the provision of methods for conveniently recovering substantially all of the sulfur values from acid sludge; and the provision of methods for producing sulfur or carbon disulfide from acid sludge alone or from acid sludge and spent alkylation acid or hydrogen sulfide-containing gases. Other features will be in part apparent and in part pointed out hereinafter.

The invention accordingly comprises the steps and sequence of steps, and features of manipulation, which will be exemplified in the methods hereinafter described, and the scope of the application of which will be indicated in the following claims.

In the treatment of various petroleum fractions with sulfuric acid, a mixture of acid, water, hydrocarbons and the compounds of the acid and oil is separated, leaving behind the treated oil. This mixture varies in its composition and physical properties and is known as acid sludge. Other processes such as alkylation of hydrocarbons with sulfuric acid also produce acid sludges which are known as spent alkylation acid. These materials constitute a serious problem in the industry and while it has been possible to recover part of the acid values of these by-products, the processes are relatively expensive and require considerable equipment. These costs have been assumed by the industry because the nuisance arising from other disposal methods has caused the public to demand more adequate treatment.

Various methods have been proposed in the past for relief of the situation such as dilution of the acid, separation of a portion of the hydrocarbons and refortification of the acid with sulfur trioxide, reaction with ammonia, sodium chloride and other materials to use the acid values, and pyrolysis to free sulfur dioxide. This sulfur dioxide has been used in sulfuric acid manufacture and has been suggested as a source of elemental sulfur and carbon disulfide by suitable reduction techniques. These previously known methods, however, have not proved to be completely satisfactory primarily because of the lack of economy in the processes.

In accordance with the present invention methods are provided for effectively recovering the sulfur values from acid sludge, both of the conventional type and of the spent alkylation acid type, and from other gases and liquids containing sulfur values. The methods of the present invention are economical and provide substantially complete recovery of sulfur from the acid sludge. The reaction product so formed may be utilized in any desired way as, for example, in the production of sulfur or carbon disulfide. In addition, systems are provided for efficiently recovering the sulfur values from sulfur dioxide-containing gases produced in fashions other than by the decomposition of acid sludge.

In the accompanying drawings, in which several of various possible embodiments of the invention are illustrated, Fig. 1 is a flow diagram illustrating a sulfur recovery process of the present invention for recovering elemental sulfur from sulfur dioxide-containing gases;

Figure 1:
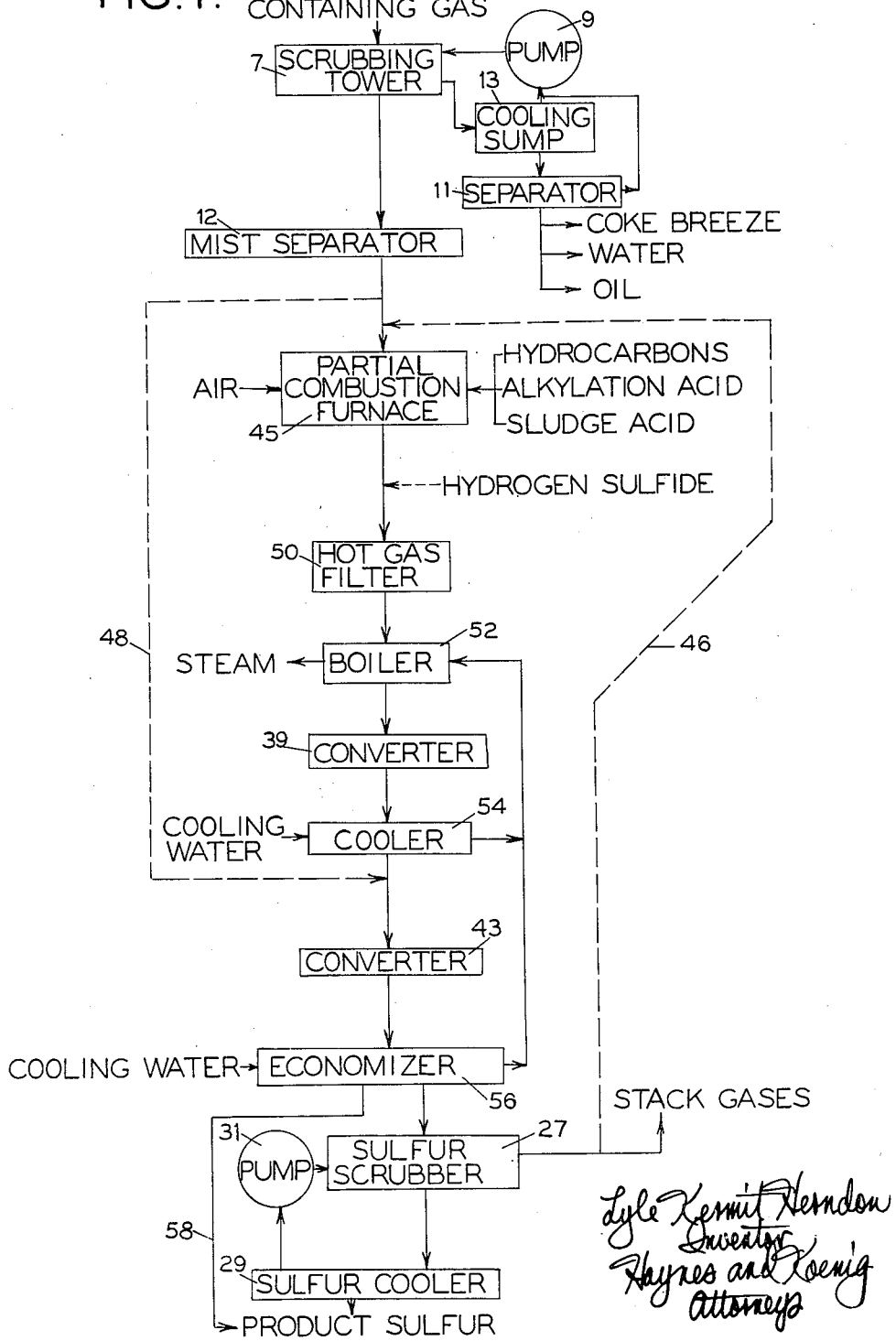

The flow diagram of Fig. 1 represents a process in which sulfur dioxide-containing gas from any convenient source may be utilized as the input gas to a scrubber unit or scrubbing tower 7. For example, smelter off gases or the effluent gases from any acid sludge decomposer may be used. The effluent gases from the decomposer shown in Fig. 1 of my copending patent application, Serial No. 14,173, filed March 11, 1948, are a useful source of sulfur dioxide-containing gases. The sulfur dioxide content of the input gas may vary over wide limits such as between approximately four to fifty mole percent at the preferred input temperatures of the gases to scrubber 7 (which is in the neighborhood of 500° to 1600° F., but preferably about 900° F.). The input gas may also include large percentages of water vapor and usually some hydrocarbons, carbon monoxide and carbon dioxide. Of course, cool gases could be used which would have correspondingly higher sulfur dioxide concentrations as adjusted to the lower temperatures.

Scrubber 7 may be any type of wet purification unit, but is preferably of the type shown in the copending U. S. application of Nevins and Gilliam, Serial No. 574,607, filed January 25, 1945. This unit together with its associated components, a pump 9, a cooling sump 13 and a separator 11 function to remove water vapor, condensable oils or hydrocarbons and coke breeze from the input gas. The coolant for scrubber 7 may be oil, water, liquid sulfur or any other suitable cooling medium. The scrubbed gases preferably pass through a mist separator 12 which removes any entrained liquid particles which are returned to the scrubber. This separator is optional, however.

The scrubbed gases are cooled by this scrubbing action to temperatures in the order of about 100° to 300° F. and these gases are thereafter sent to a partial combustion furnace 45. This furnace comprises an enclosed chamber having gas inlet and outlet ports and separate ports for the introduction of air and reducing agents, such as hydrocarbons, alkylation acids or acid sludges. The chamber may be refractory lined or may be a shell of steel insulated externally and it may include interior baffles. The only structural requirements are that it be able to withstand internal temperatures of up to about 2200° F. and the passage of hot sulfur dioxide and reducing gases therethrough.

This unique combustion furnace has two primary purposes. The first is to reduce some of the sulfur dioxide content of the gas by reactions with reducing components, and the second is to provide enough heat for these reactions and subsequent conversion steps. Although the exact reactions occurring in the furnace at any one time for any particular scrubbed entrance gas are extremely complex and thus cannot be precisely determined, the following reactions probably occur:

1. $CH_4 + 2O_2 \rightarrow CO_2 + 2H_2O$
2. $2CH_4 + 3O_2 \rightarrow 2CO + 4H_2O$
3. $2C_{10}H_{22} + 31O_2 \rightarrow 20CO_2 + 22H_2O$
4. $C + O_2 \rightarrow CO_2$
5. $2CO + O_2 \rightarrow 2CO_2$
6. $2CO + SO_2 \rightarrow S + 2CO_2$
7. $\frac{1}{x}(CH_2)_x + SO_2 \rightarrow H_2S + CO_2$
8. $CH_4 \rightarrow C + 2H_2$
9. $C + SO_2 \rightarrow CO_2 + S$
10. $3H_2 + SO_2 \rightarrow H_2S + 2H_2O$ The first five of these reactions are exothermic and are primarily to produce the heat and higher temperatures needed for the reactions in the furnace 45. The latter five reactions are primarily for reduction of sulfur dioxide to sulfur and hydrogen sulfide. Some of these latter reactions may also be exothermic such as Reactions 6, 7 and 9. The temperature of the reacting gases within this furnace may range from about 1500° F. to 2200° F., but is preferably of the order of 1800° F.–1900° F.

The flexibility of this unit is one of the most important aspects of the invention. If gases of high sulfur dioxide content are utilized, the air input to this furnace 45 may be conveniently decreased. Reducing agents, such as hydrocarbons (preferably gases or liquids), alkylation and sludge acids may be introduced into the reaction furnace as illustrated in sufficient amounts to react as shown above. If liquid reducing agents are employed they are preferably introduced in an atomized form or in a fine spray. The amounts introduced are controlled in response to exit gas temperature and content. The addition of any reducing agents may be avoided if the input gas to the scrubber contains sufficient reducing agents such as carbon monoxide or hydrocarbons. One manner of increasing the hydrocarbon content of the furnace entry gas is by using oil as a coolant in scrubber 7 so that larger amounts of hydrocarbons are carried over in the scrubbed gas to the furnace 45. An advantage of appreciable amounts of carbon monoxide in the input gases is that it will not compete with the sulfur dioxide in the reduction reactions (as does carbon dioxide). Also, if this is desirable, the more carbon monoxide used as a reducing agent, the less hydrogen sulfide will be formed (e. g., see Reaction 6 above).

Furnace 45 as described above operates equally effectively on high or low sulfur dioxide content gases. More concentrated gases will increase the furnace temperature, and for that reason it may be desirable to decrease the oxygen-containing gas (such as air) input and/or to recirculate some of the tail or stack gases (as shown by a dotted line 46 on Fig. 1) through the furnace to decrease the furnace temperature. Another optional arrangement is to by-pass part of the scrubber gas around the furnace 45 as indicated by dotted line 48, thereby making possible a reduction in the physical size of furnace 45.

It can be seen, therefore, that an effluent gas from the furnace regardless of input gas content and concentration within the prescribed limits, may be obtained which has substantially a 1:2 mole ratio of sulfur dioxide to hydrogen sulfide. In many instances waste acidic gases or other hydrogen sulfide-containing gases are available at the site of the sulfur recovery system and may be conveniently used. In such cases an input of hydrogen sulfide is provided, as illustrated in Fig. 1. The amount of the hydrogen sulfide available will determine the particular ratios of air to input sulfur dioxide gases in furnace 45, the relative amounts thereof being balanced to yield a 1:2 mole ratio of sulfur dioxide to hydrogen sulfide at the entrance to a first converter 39.

As an example of the operation of furnace 45, typical gas compositions are set out below:

|  | Input Gas to Scrubber 7, Volume (Mole) Percent | Scrubber 7 Exit Gas, Volume (Mole) Percent |
|---|---|---|
| $SO_2$ | 4.11 | 4.68 |
| $CO_2$ | 9.82 | 11.17 |
| $CO$ | 9.82 | 11.17 |
| $O_2$ | .42 | .47 |
| $N_2$ | 52.27 | 59.50 |
| $H_2O$ | 18.62 | 11.61 |
| $CH_4$ | .36 | .41 |
| $C_{10}H_{22}$ | 3.24 | .99 |
| $C$ | 1.34 | |

In this example no additional reducing agents were introduced (the input gas contained an adequate quantity of hydrocarbons and carbon monoxide), and the molecular ratio of input air to scrubber exit gas was approximately 1:1.25. Additional hydrogen sulfide was added in the ratio of 1 mole of hydrogen sulfide to approximately 126.5 moles of secondary air. The ratios of secondary air and additional hydrogen sulfide to the exit scrubber gas may be varied over extremely wide ranges depending upon the composition of the input sulfur dioxide-containing gases.

The effluent gas from the furnace is then filtered by a hot gas filter 50 of any conventional type to remove any entrained solids such as coke breeze. It has been found by actual operation that another advantage of this invention is that filter 50 as well as furnace 45 will be self cleaning. This is because the temperature of the gases passing through is sufficiently high to burn out carbon particles. The filtered gas stream is passed through a boiler 52 and then into a first catalyst converter 39. Any conventional converter using a catalyst which will catalyze the reaction between hydrogen sulfide and sulfur dioxide to form sulfur may be utilized. This converter is preferably of the type described in Patent 2,497,095 using activated alumina or bauxite as a catalyst. The steam boiler 52 serves a double function at this point; first to reduce the gas temperature to about 450° F. to 550° F. (preferably 500° F.), and second to recover the excess heat produced by the furnace reactions in the form of steam. The feed water for boiler 52 is obtained from a cooler 54 and economizer 56 which serve to cool the effluent gases from converter 39 and a second converter 43. Converters 39 and 43 serve to catalytically convert the hydrogen sulfide and sulfur dioxide to sulfur.

The presence of cooler 54 is desirable because the exothermic reaction in converter 43 usually increases the gas temperature in the neighborhood of 100° F. In some instances some of the gas phase sulfur is condensed in economizer 56 so that provision is made for its removal as indicated by line 58.

A sulfur scrubber 27 with its associated cooler 29 and pump 31 operates to condense the gas phase elemental sulfur to its liquid phase. Although any conventional sulfur scrubber may be employed, it is preferred that a scrubber using liquid sulfur as a coolant such as is described in the above mentioned U. S. application, Serial No. 574,607, be employed.

In some instances it may be desirable to omit the first converter 39 and its cooler 54 and pass the gas stream from boiler 52 directly to converter 43. Most of the sulfur in the gas stream may be recovered without the use of series converters as shown, but where especially clean tail gases are desired series conversion is more desired.

As an example of the effectiveness of this system to remove the sulfur values from the feed gas, the following typical analysis of the stack gas is given.

| | Volume (mole) per cent |
|---|---|
| $H_2S$ | 0.32 |
| $SO_2$ | 0.16 |
| $CO_2$ | 17.47 |
| $CO$ | .62 |
| $N_2$ | 66.99 |
| $H_2O$ | 14.33 |
| $CH_4$ | .06 |
| $S_2$ | .05 |

It will be understood that any conventional means, such as a blower, may be used to cause the gases to flow through the system as illustrated and described above.

Figure 2:
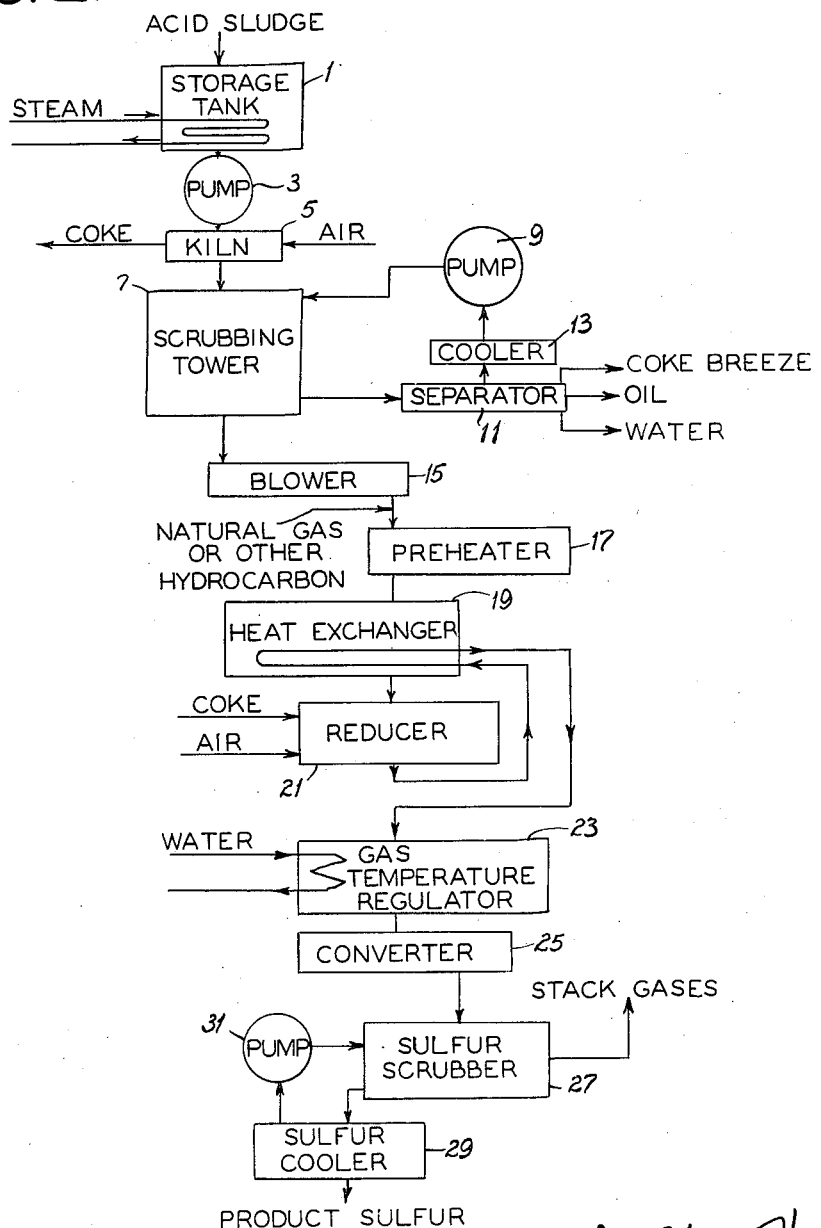
Fig. 2 is a flow diagram illustrating a process of the present invention for production of sulfur from acid sludge.

Referring now to Fig. 2, there is indicated at numeral 1 a storage tank into which acid sludge may be introduced by any convenient method. The acid sludge stored in tank 1 may range from very thick sludges, high in hydrocarbon content, to thin sludges, high in acid content, such as spent alkylation acids, or various mixtures of these acids and sludges. If the acid sludge is viscous at room temperature it may be preheated by heat exchange or by steam coils to a temperature up to approximately 190° F., which is below the temperature at which substantial decomposition of the sludge will occur. The sludge in tank 1 is preferably kept homogeneously mixed by suitable agitation, such as by continuously recycling a small portion of the acid sludge.

A pump 3 feeds a stream of sludge onto an incandescent bed of coke of a kiln 5 where the acid sludge is mixed with the incandescent coke. The coke bed is heated to a temperature such that the initial coke-sludge mixture is maintained at a temperature not substantially less than 500° F., 600° F. being preferred. Still higher temperatures, for example as high as 1000° F. or even higher may be employed, if desired.

When this mixing takes place the acid sludge is decomposed into coke and a gaseous mixture including sulfur dioxide, other sulfur bearing gases, water vapor, oil vapor, nitrogen and oxygen from the air, and small coke particles called coke breeze. This decomposition is preferably carried out in a kiln such as that shown in Fig. 1 of my copending patent application, Serial No. 14,173, filed March 11, 1948. An advantage of using this kiln is that the sulfur content of the acid sludge is substantially completely converted economically to sulfur dioxide. This effluent gas composition may be conveniently regulated by controlling the air admitted to the kiln.

The hydrocarbon content of the acid sludge feed is generally of such a value that more coke is produced by this pyrolysis reaction than is required for burning in the kiln to supply the quantity of heat needed for the pyrolysis. In this case only a portion of the coke formed by the decomposition need be burned to maintain the coke bed in the incandescent state. The excess is generally more than sufficient for a subsequent reduction of the sulfur dioxide should this be desired. For this reason it is preferable initially to mix high and low acid content sludges so the reaction will be at least self-sustaining as to coke. However, if the hydrocarbon content is low, the reaction may be maintained by introducing sufficient amounts of coke to balance the heat requirements of the reaction.

The effluent sulfur dioxide bearing gas is then conducted to a wet purification unit such as for example, the scrubbing tower 7, which removes hydrocarbon vapor, coke breeze and water vapor. A cooling medium, such as water or oil, for example, is fed continuously by pump 9 to scrubbing tower 7 where water and oil vapors are condensed by the coolant. Separator 11 functions to separate the condensed oil vapor from the condensed water vapor and the coke breeze and discharge these three components separately. Cooler 13 connects separator 11 to pump 9 and serves to decrease the temperature of the recovered coolant to a value where it can be recirculated through tower 7.

The scrubbed effluent gas then may be sent by a blower 15 to a pre-heater unit 17 or the gas may be sent to a gas holder (not shown) and from there to blower 15 and pre-heater unit 17. The gas holder is desirable only when kiln 5 is operated intermittently. A gas holder may also be used if two or more intermittently and cyclically operated kilns are utilized to feed scrubbing tower 7. However, continuous operation of all units is preferable and as such operation requires no gas holder it is omitted from the drawings.

Natural gas or some other hydrocarbon or mixture of hydrocarbons is introduced into the line connecting blower 15 and preheater 17. The amount of gas so introduced is dependent primarily on the composition of the effluent gas. Preheater unit 17 and a heat exchanger 19 serve to supply sufficient heat to the gases introduced into a reducer unit 21 to increase the temperature of the gases to an efficient reaction temperature for reducing sulfur dioxide to sulfur in vapor phase. The amount of coke and air fed into reducer 21 is dependent upon the rate of flow of gas therethrough, the reducing surface therein, the composition of the gas, the temperature conditions and similar factors. Although many types of reducers are satisfactory for this operation, it is preferred that reducer 21 include an incandescent bed of coke maintained at a temperature of between approximately 1200° F. and 1600° F., over which the effluent gas is passed.

The coke used to feed reducer 21 is usually supplied by the excess of coke removed from kiln 5, as the composition of the acid sludge feed is generally such that an excess of coke over that required for the operation of kiln 5 and reducer 21 is produced by kiln 5. The effluent gas from reducer 21 is conducted through heat exchanger 19 to a gas temperature regulator 23 where the gas temperature is regulated to a range satisfactory for operation of a converter 25 (similar to unit 39 described above). The input gas to converter 25 includes some unreduced sulfur dioxide, methane, hydrogen sulfide, carbon dioxide, water vapor, vapor phase sulfur, carbon monoxide and hydrogen. Converter 25 catalytically converts the sulfur dioxide and the hydrogen sulfide to vapor phase sulfur which is introduced into sulfur scrubber 27 where the sulfur is liquified. Converter 25 may be omitted if desired as most of the sulfur dioxide is normally converted to vapor phase sulfur in reducer 21. If such omission is made the effluent gas is fed directly to scrubber 27 from regulator 23. Liquid sulfur is preferably used as a cooling medium in this scrubber, the liquid sulfur being continuously re-circulated through scrubber 27 and cooler 29 by means of pump 31 to condense the vapor phase sulfur by countercurrent scrubbing action of the liquid sulfur. The exit stack gases contain substantially none of the sulfur values which were in the sludge.

Figure 3:
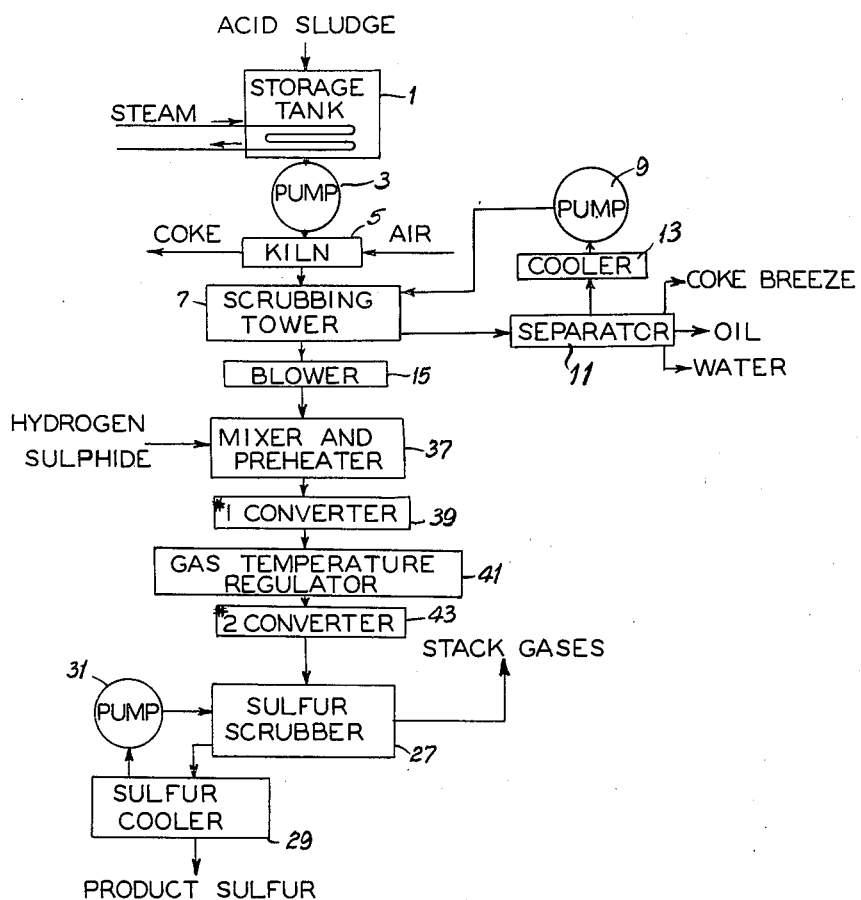
Fig. 3 is a flow diagram illustrating an alternate process of the present invention for producing sulfur from acid sludge.

Fig. 3 is identical with Fig. 2 in organization and operation through the blower unit 15. The effluent sulfur dioxide-containing gas from scrubbing tower 7 is fed by blower 15 to a mixer and preheater unit 37 where hydrogen sulfide from gas cleaning or refinery gas is intermixed and preheated with the sulfur dioxide gas. The hydrogen sulfide serves as a reducing material and renders unnecessary a reducer, such as indicated at numeral 21 of Fig. 2. The intermixed gases are then conducted to converter unit 39 where, aided by one of the catalysts customarily used for this reaction, vapor phase sulfur is produced. A gas temperature regulator 41 (which corresponds to unit 23 of Fig. 2) controls the temperature of the gas to the #2 converter 43, which further catalytically converts the sulfur dioxide and hydrogen sulfide to vapor phase sulfur. Converter 43 may, however, be omitted if desired with only a modest reduction in sulfur dioxide conversion. This sulfur bearing gas is then introduced into sulfur scrubber unit 27 which functions, as described in Fig. 2, in cooperation with pump 31 and cooler 29 to condense the vapor phase sulfur to liquid phase.

Figure 4:
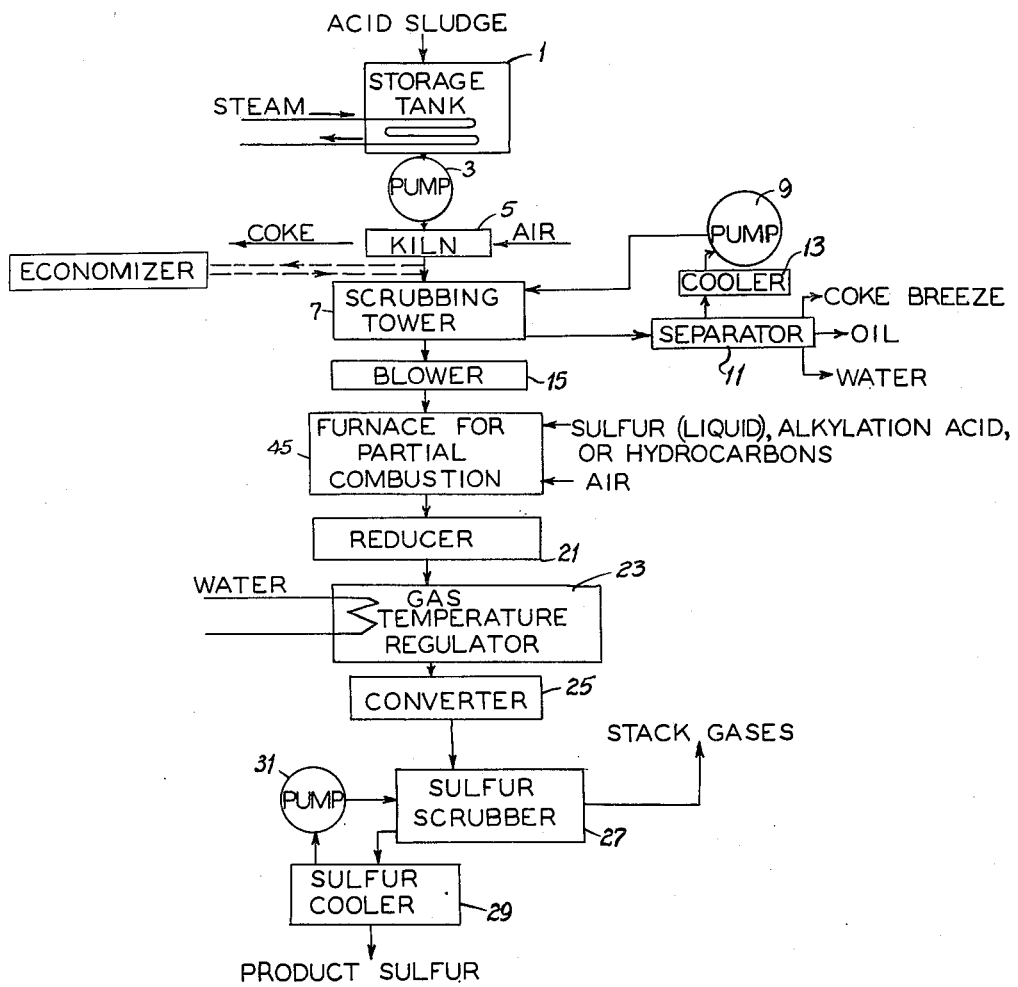
Fig. 4 is a flow diagram illustrating another process of the present invention for producing sulfur from acid sludge; and, Fig. 5 is a flow diagram illustrating a still further process of the present invention for production of sulfur from acid sludge. Similar reference characters indicate corresponding parts throughout the several views of the drawings.

Fig. 4 is identical with Fig. 2 through unit 15, the effluent gas from unit 15, however, being fed to a partial combustion furnace 45 of any desired type (such as for example, described in Fig. 1). Into furnace 45 is fed the effluent sulfur containing gas from tower 7, air and spent alkylation acid, liquid sulfur or hydrocarbons. The combustion in furnace 45 is regulated by the balancing of the three inputs; air, the effluent sulfur dioxide-containing gas and the spent alkylation acid, hydrocarbons or sulfur, so as to give a gas mixture particularly adapted for subsequent reduction in reducer unit 21 (as described above in relation to Fig. 2). The effluent gas from reducer 21 is then processed as described above in relation to Fig. 2 by a gas temperature regulator 23, converter 25 and sulfur scrubber 27 with its associated cooler 29 and pump 31. Converter 25 may be omitted from the process shown in Fig. 4 with only a modest sacrifice in sulfur yield, the conversion to sulfur in the reducer 21 being great enough to produce satisfactory sulfur recovery and yields.

Figure 5:
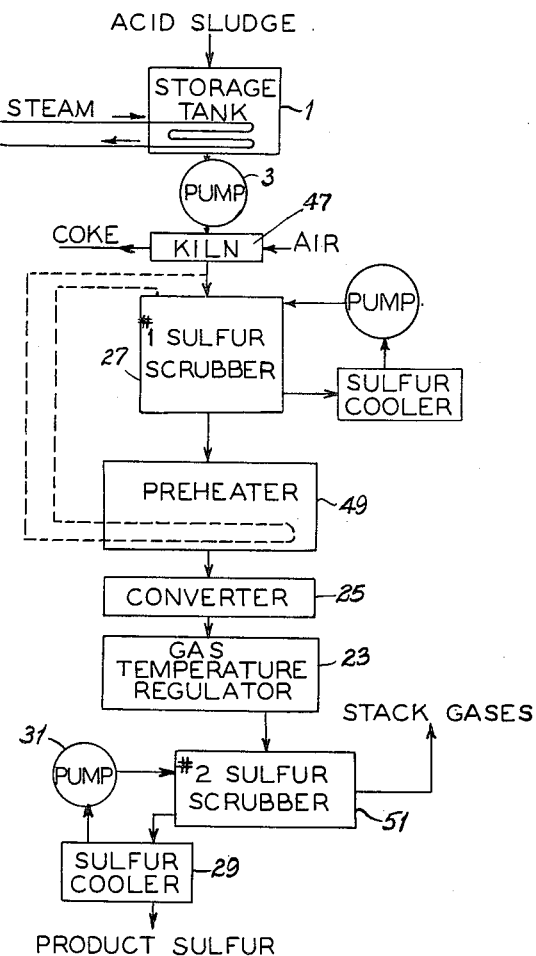

Referring now to Fig. 5, there is indicated at numeral 47 a kiln. Acid sludge is fed by pump 3 from storage tank 1 onto the surface of an incandescent bed of coke contained in such kiln. Kiln 47 contains a second bed of coke through which is forced the effluent sulfur dioxide-containing gases from the first coke bed. It is preferred that kiln 47 be similar to that illustrated in Fig. 2 of my copending patent application, Serial No. 14,173, filed March 11, 1948. The conversion of acid sludge to vapor phase sulfur in such a kiln is high and the effluent gas from the kiln, after the stripping of sulfur therefrom by scrubber 27, may be either discharged as stack gas or may be sent to a preheater unit 49 to increase the gas temperature for further conversion of any remaining sulfur dioxide to sulfur by converter 25. The latter method of course gives greater yields of sulfur, but the former method provides satisfactory conversion in most instances.

Preheater unit 49 may conveniently include heat exchange with the exit gas of kiln 47 and such an arrangement is indicated by dotted lines on Fig. 5. If converter 25 is utilized for further conversion of the effluent gas of #1 sulfur scrubber 27 to sulfur, a #2 sulfur scrubber 51, similar to scrubber 27, is employed to recover the vapor phase sulfur in liquid phase as described above.

It is to be understood that in accordance with the present invention kilns 5 and 47 may be operated intermittently or that a plurality of such kilns could be operated cyclically in parallel and by the use of a gas holder after sulfur scrubbing tower 7 in Figs. 1-4 or scrubber 27 of Fig. 5 the balance of the systems could be operated continuously.

The recovery of sulfur from the vapor phase sulfur-containing gas fed to sulfur scrubber unit 27 in Figs. 1-4 or to scrubber unit 51 of Fig. 5 may be accomplished by conducting this gas to a carbon disulfide furnace of any of the customary types to be converted to carbon disulfide, instead of recovering the sulfur as elemental sulfur per se by condensation.

In view of the above, it will be seen that the several objects of the invention are achieved and other advantageous results attained.

As many changes could be made in the above methods without departing from the scope of the invention, it is intended that all matter contained in the above description or shown in the accompanying drawings shall be interpreted as illustrative and not in a limiting sense.

I claim:

1. The method of recovering sulfur from acid sludge which comprises mixing acid sludge with incandescent coke to decompose the sludge at a temperature not substantially below 500° F. into coke and a gaseous mixture comprising sulfur dioxide, scrubbing said gaseous mixture to remove coke breeze, water and oil vapor therefrom, intermixing a hydrocarbon containing component with said gaseous mixture, preheating the intermixed vapor thus obtained, reducing sulfur dioxide in said intermixed vapor by bringing it into contact with incandescent coke at a temperature of between approximately 1200° F. and 1600° F., and recovering sulfur from the vapor mixture so obtained.

2. The method of recovering sulfur from acid sludge which comprises mixing acid sludge with incandescent coke to decompose the sludge at a temperature not substantially below 500° F. into coke and the gaseous mixture comprising sulfur dioxide, scrubbing said gaseous mixture to remove coke breeze, water and oil vapor therefrom, intermixing a hydrocarbon containing component with said gaseous mixture, preheating the intermixed vapor thus obtained, reducing sulfur dioxide in said intermixed vapor by bringing it into contact with incandescent coke at a temperature of between approximately 1200° F. and 1600° F., further reducing the vapor mixture so obtained by catalytically converting sulfur dioxide to sulfur, and recovering sulfur from the vapor mixture so obtained.

3. The method of recovering sulfur from acid sludge which is at a temperature not substantially in excess of 190° F. which comprises flowing acid sludge onto a first bed of incandescent coke to raise the temperature of said sludge quickly to approximately 600° F. to decompose the sludge into coke and a gaseous mixture comprising sulfur dioxide, sulfur-bearing gases, coke breeze, and oil vapor, scrubbing said gaseous mixture to remove coke breeze, water and oil vapor therefrom, intermixing a hydrocarbon containing component with said gaseous mixture, preheating the intermixed vapor thus obtained, reducing sulfur dioxide in said intermixed vapor by bringing it into contact with a second bed of incandescent coke at a temperature of between approximately 1200° F. and 1600° F., further reducing the vapor mixture so obtained by catalytically converting sulfur dioxide, hydrogen sulfide and other sulfur compounds in the presence of an aluminum oxide catalyst to sulfur and condensing vapor phase sulfur so obtained by countercurrently scrubbing said vapor phase sulfur with liquid sulfur.

LYLE KERMIT HERNDON.

REFERENCES CITED

The following references are of record in the file of this patent:

UNITED STATES PATENTS

| Number | Name | Date |
|---|---|---|
| 1,771,480 | Benner et al. | July 29, 1930 |
| 2,066,896 | Merriam | Jan. 5, 1937 |
| 2,080,360 | Lepsoe | May 11, 1937 |
| 2,080,384 | Carter | May 11, 1937 |
| 2,110,267 | Harrington et al. | Mar. 8, 1938 |
| 2,386,202 | Fernelius | Oct. 9, 1945 |